United States Patent
Birkler et al.

(10) Patent No.: US 9,787,904 B2
(45) Date of Patent: Oct. 10, 2017

(54) METHODS AND APPARATUSES FOR CAPTURING IMAGES USED FOR GENERATING 3D MODELS OF ROOMS

(71) Applicant: InsideMaps Inc., Los Altos, CA (US)

(72) Inventors: Paul Joergen Birkler, Foster City, CA (US); George Bolanos, Los Altos, CA (US); Juan Lozano, San Francisco, CA (US)

(73) Assignee: INSIDEMAPS INC., Los Altos, CA (US)

( * ) Notice: Subject to any disclaimer, the term of this patent is extended or adjusted under 35 U.S.C. 154(b) by 265 days.

(21) Appl. No.: 14/526,322

(22) Filed: Oct. 28, 2014

(65) Prior Publication Data

US 2015/0116509 A1  Apr. 30, 2015

Related U.S. Application Data

(60) Provisional application No. 61/898,232, filed on Oct. 31, 2013.

(51) Int. Cl.
*G06K 9/36* (2006.01)
*H04N 5/232* (2006.01)
(Continued)

(52) U.S. Cl.
CPC ....... *H04N 5/23293* (2013.01); *G06T 15/205* (2013.01); *H04N 1/00233* (2013.01);
(Continued)

(58) Field of Classification Search
None
See application file for complete search history.

(56) References Cited

U.S. PATENT DOCUMENTS 6,084,592 A     7/2000  Shum et al.
7,536,032 B2 *  5/2009  Bell ..................... G06F 3/0425
                                                        382/103
(Continued)

OTHER PUBLICATIONS

Olbrich et al, Augmented reality supporting user-centric building information management, The Visual Computer, Oct. 2013, vol. 29, Issue 10, pp. 1093-1105.*

(Continued)

*Primary Examiner* — Andrae S Allison
(74) *Attorney, Agent, or Firm* — Vierra Magen Marcus LLP

(57) ABSTRACT

Methods and apparatuses for capturing images used for generating three-dimensional (3D) models of rooms are described herein. User location indicators and image location indicators are displayed on a display of a mobile computing device, such as, but not limited to, a smartphone, a tablet computing device, or a laptop computer. Images and corresponding orientation information are obtained for each of a plurality of walls of each of a plurality of rooms using a camera and at least one sensor of the mobile computing device. The obtained images and corresponding orientation information are transferred from the mobile computing device to a remote system that is configured to generate 3D models of rooms based on images. The mobile computing device receives data that enables the mobile computing device to display a 3D model of the room(s) that was/were imaged.

22 Claims, 13 Drawing Sheets

(51) Int. Cl.
*H04N 1/00* (2006.01)
*G06T 15/20* (2011.01)

(52) U.S. Cl.
CPC ..... *H04N 1/00244* (2013.01); *H04N 5/23222* (2013.01); *G06T 2200/08* (2013.01)

(56) References Cited

U.S. PATENT DOCUMENTS

| | | | |
|---|---|---|---|
| 9,244,533 B2* | 1/2016 | Friend | A63F 13/06 |
| 9,262,673 B2* | 2/2016 | Shotton | G06K 9/00369 |
| 9,269,150 B1* | 2/2016 | Seitz | G06K 9/00523 |
| 2009/0190798 A1* | 7/2009 | Lee | G06K 9/00201 |
| | | | 382/103 |
| 2010/0319100 A1* | 12/2010 | Chen | G01B 11/2513 |
| | | | 2/69 |
| 2011/0199470 A1 | 8/2011 | Moller et al. | |
| 2013/0004060 A1 | 1/2013 | Bell et al. | |
| 2013/0141524 A1 | 6/2013 | Karunamuni et al. | |

OTHER PUBLICATIONS

Azri, S.; Isikdag, U.; Rahman, A. A. Automatic Generation of 3D Indoor Models: Current State of the Art and New Approaches. In International Workshop on Geoinformation Advances, Johor, Malaysia, 2012, http://www.academia.edu/2604376/Automatic_Generation_of3D_Indoor_Models_Current_State_of_the_Art_and_New_Approaches.*

Aditya Sankar and Steven Seitz. 2012. Capturing indoor scenes with smartphones. In Proceedings of the 25th annual ACM symposium on User interface software and technology (UIST, 2012). ACM, New York, NY, USA, 403-412.*

Shenchang Eric Chen, QuickTime VR: an image-based approach to virtual environment navigation, Proceedings of the 22nd annual conference on Computer graphics and interactive techniques, p. 29-38, Sep. 1995.*

* cited by examiner

METHODS AND APPARATUSES FOR CAPTURING IMAGES USED FOR GENERATING 3D MODELS OF ROOMS

PRIORITY CLAIMS

This application claims priority to U.S. Provisional Patent Application No. 61/898,232, filed Oct. 31, 2013, which is incorporated herein by reference.

BACKGROUND

It is often useful to have a schematic, blue print or other model of rooms of a building when either moving furniture, buying new furniture, buying carpets or rugs, remodeling, repainting or otherwise modifying characteristic of rooms or elements therein. Various products exist, which are supposed to assist users in producing such models. Some such products, which are implemented using software, typically require that a user spend a large amount of time taking manual measurements of rooms and items therein and then manually entering such measurements into a computing device to enable the software running on computing device to generate models based on the manually entered information. More recently, special cameras have been developed that remove some of the manual procedure previously necessary, but such cameras typically costs thousands of dollars, and thus, are not readily available to most people.

DETAILED DESCRIPTION

In general, embodiments of the present invention enable three-dimensional (3D) models of rooms of buildings to be generated quickly and efficiently using images obtained using a mobile computing device. Such 3D models can be generated based on images using structure from motion (SfM) software, as is well known in the art. Various types of SfM software are available for purchase or through open source licenses. For example, Bundler software, written by Noah Snavely, generates 3D models from unordered image collections obtained from the Internet or other sources. Additionally, there are numerous other non-commercial and commercial SfM software products that generate 3D models from images obtaining using digital cameras.

For the purpose of this description, it is assumed that most any SfM software can be used to generate 3D models once appropriate images are made available to the software. In other words, embodiments of the present invention are not specifically related to the SfM software that is used to generate the 3D models. Rather, certain embodiments of the present invention are related to the techniques for obtaining the appropriate images that can be used by SfM software to generate the 3D models. Further, certain embodiments of the present invention are used to obtain metadata corresponding to the obtained images, wherein the metadata enables the SfM software to generate 3D models more efficiently and quickly than has previously been possible. Advantageously, embodiments of the present invention enable such images and corresponding metadata to be obtained using mobile computing devices that many (if not most) people that may be interested in 3D models of rooms already own.

Figure 1:
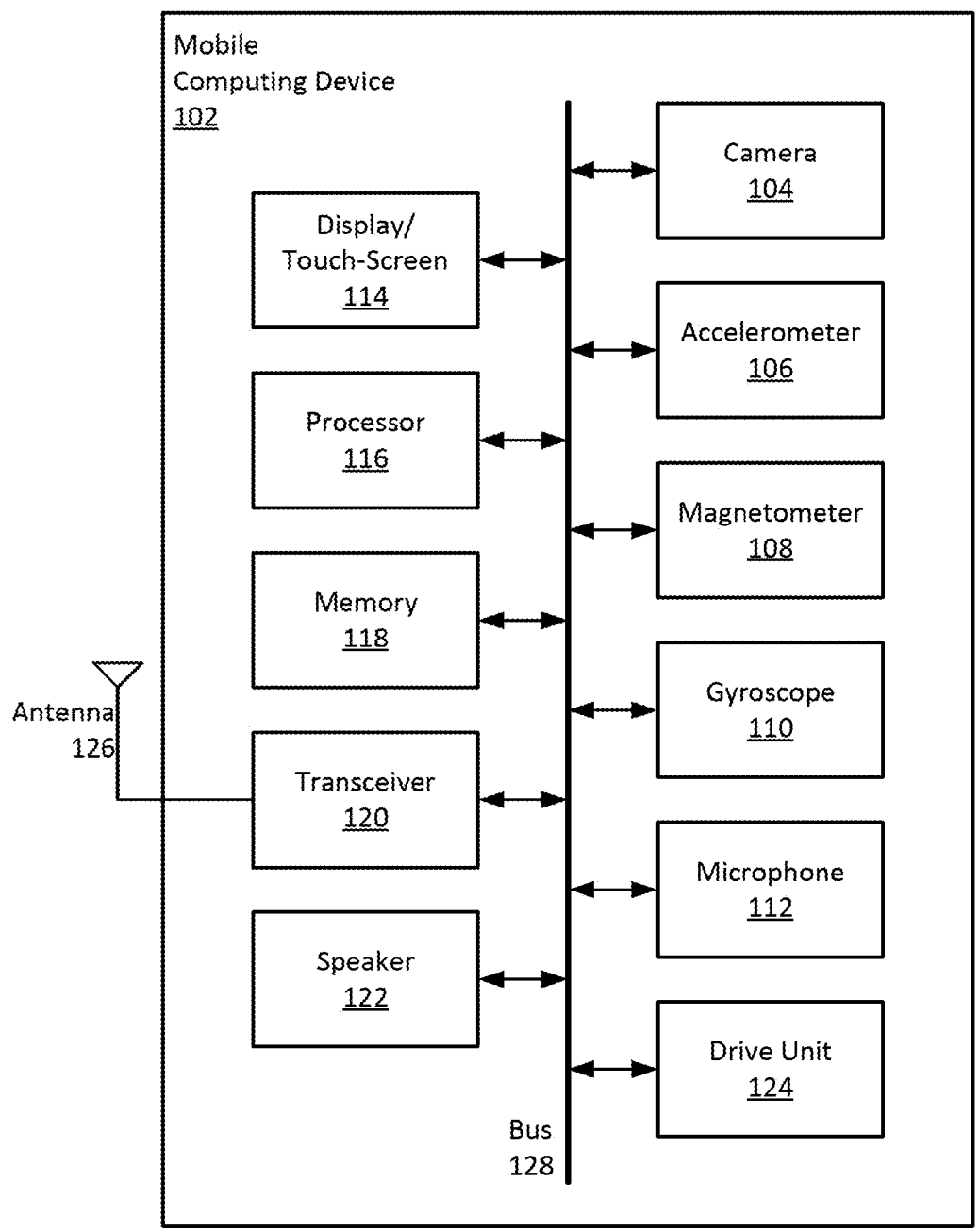
FIG. 1 illustrates an exemplary mobile computing device with which embodiments of the present invention can be used.

FIG. 1 illustrates an exemplary mobile computing device 102 with which embodiments of the present invention described herein can be used. The mobile computing device 102 can be a smartphone, such as, but not limited to, an iPhone™, a Blackberry™, an Andriod™-based or a Windows™-based smartphone. The mobile computing device 102 can alternatively be a tablet computing device, such as, but not limited to, an iPad™, an Andriod™-based or a Windows™-based tablet. For another example, the mobile computing device 102 can be iPod Touch™, or more generally, any other mobile computing device that includes a camera capable of capturing monocular digital images and at least one of (and preferably all of) an accelerometer, a magnetometer and a gyroscope. It is even possible that the mobile computing device 102 is a laptop computer, so long as the laptop computer includes, or has attached to it, a camera and one or more of the aforementioned sensors (i.e., at least one of an accelerometer, a magnetometer or a gyroscope), or more generally, can obtain orientation information indicative of an orientation of the mobile computing device when the camera is used to obtain an image.

Referring to FIG. 1, the mobile computing device 102 is shown as including a camera 104, an accelerometer 106, a magnetometer 108, a gyroscope 110, a microphone 112, a display 114 (which may or may not be a touch screen display), a processor 116, memory 118, a transceiver 120, a speaker 122 and a drive unit 124. Each of these elements is shown as being connected to a bus 128, which enables the various components to communicate with one another and transfer data from one element to another. It is also possible that some of the elements can communicate with one another without using the bus 128.

The camera 104 can be used to obtain images. The accelerometer 106 can be used to measure linear acceleration relative to a frame of reference, and thus, can be used to detect motion of the mobile computing device 102 as well as to detect an angle of the mobile device 102 relative to the horizon or ground. The magnetometer 108 can be used as a compass to determine a direction of magnetic north and bearings relative to magnetic north. The gyroscope 110 can be used to detect both vertical and horizontal orientation of the mobile computing device 102, and together with the accelerometer 106 and magnetometer 108 can be used to obtain very accurate information about the orientation of the mobile computing device 102. The microphone 112 can be used to detect voice commands for controlling the mobile computing device 102, as well as for enabling the mobile computing device 102 to operate as a mobile phone, e.g., if the mobile computing device 102 is a smartphone. It is also possible that the mobile computing device 102 includes additional sensor elements, such as, but not limited to, an ambient light sensor and/or a proximity sensor.

The display 114, which many or not be a touch screen type of display, can be used as a user interface to visually display items (e.g., images, options, instructions, etc.) to a user and accept inputs from a user. Further, the mobile computing device 102 can include additional elements, such as keys, buttons, a track-pad, a trackball, or the like, that accept inputs from a user.

The memory 118 can be used to store software and/or firmware that controls the mobile computing device 102, as well to store images captured using the camera 104, but is not limited thereto. Various different types of memory, including non-volatile and volatile memory can be included in the mobile computing device 102. The drive unit 124, e.g., a hard drive, but not limited thereto, can also be used to store software that controls the mobile computing device 102, as well to store images captured using the camera 104, but is not limited thereto. The memory 118 and the disk unit 124 can include a machine readable medium on which is stored one or more sets of executable instructions (e.g., apps) embodying one or more of the methodologies and/or functions described herein. In place of the drive unit 124, or in addition to the drive unit, the mobile computing device can include a solid-state storage device, such as those comprising flash memory or any form of non-volatile memory. The term "machine-readable medium" as used herein should be taken to include all forms of storage media, either as a single medium or multiple media, in all forms; e.g., a centralized or distributed database and/or associated caches and servers; one or more storage devices, such as storage drives (including e.g., magnetic and optical drives and storage mechanisms), and one or more instances of memory devices or modules (whether main memory, cache storage either internal or external to a processor, or buffers. The term "machine-readable medium" or "computer-readable medium" shall be taken to include any tangible non-transitory medium which is capable of storing or encoding a sequence of instructions for execution by the machine and that cause the machine to perform any one of the methodologies. The term "non-transitory medium" expressly includes all forms of storage drives (optical, magnetic, etc.) and all forms of memory devices (e.g., DRAM, Flash (of all storage designs), SRAM, MRAM, phase change, etc., as well as all other structures designed to store information of any type for later retrieval.

The transceiver 120, which is connected to an antenna 126, can be used to transmit and receive data wirelessly using, e.g., Wi-Fi, cellular communications or mobile satellite communications. The mobile computing device 102 may also be able to perform wireless communications using Bluetooth and/or other wireless technologies. It is also possible the mobile computing device 102 includes multiple types of transceivers.

The speaker 122 can be used to provide auditory instructions, feedback and/or indicators to a user, playback recordings (e.g., musical recordings), as well as to enable the mobile computing device 102 to operate as a mobile phone.

The processor 116 can be used to control the various other elements of the mobile computing device 102, e.g., under control of software and/or firmware stored in the memory 118 and/or drive unit 124. It is also possible that there are multiple processors, e.g., a central processing unit (CPU) and a graphics processing unit (GPU).

Figure 2:
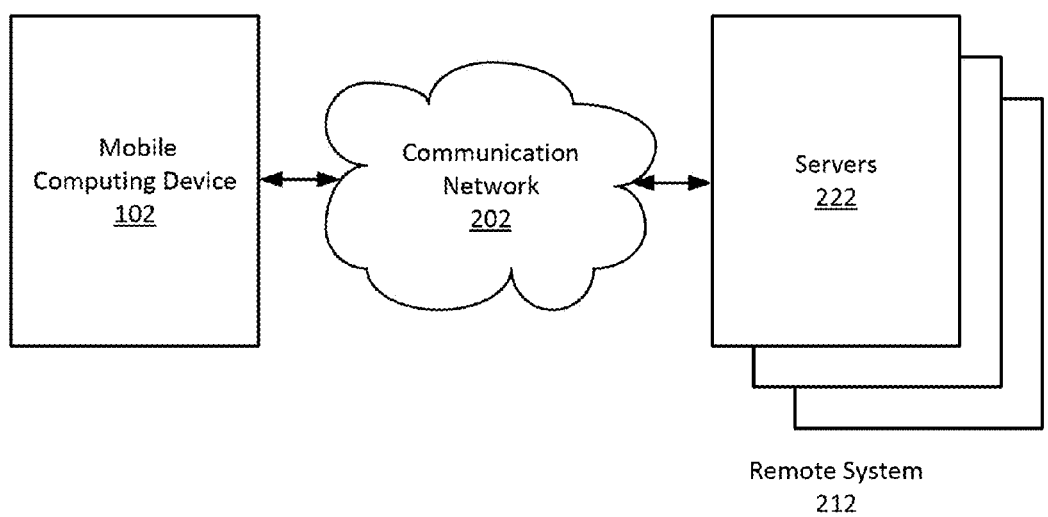
FIG. 2 is used to illustrate that a mobile computing device can use a communication network to upload data to, and download data from, a remote system that includes one or more servers.

FIG. 2 is used to illustrate that the mobile computing device 102 can use a communication network 202 to upload data to, and download data from, a remote system 212 that includes one or more servers 222. Preferably, the mobile computing device 102 can achieve such uploading and downloading wirelessly. Various communication protocols may be used to facilitate communication between the various components shown in FIG. 2. These communication protocols may include, for example, TCP/IP, HTTP protocols, wireless application protocol (WAP), vendor-specific protocols, customized protocols, but are not limited thereto. While in one embodiment, communication network 202 is the Internet, in other embodiments, communication network 202 may be any suitable communication network including a local area network (LAN), a wide area network (WAN), a wireless network, an intranet, a private network, a public network, a switched network, and combinations of these, and the like.

The distributed computer network shown in FIG. 2 is merely illustrative of a computing environment in which embodiments the present invention can be implemented, but is not intended to limit the scope of the embodiments described herein. One of ordinary skill in the art would recognize other variations, modifications, and alternatives. For example, the various servers 222 may be distributed. In other words, the remote system 212 can be a distributed system. Further, the servers can include or have access to databases and/or other types of data storage components, each of which can be considered part of the remote system 212. As will be appreciated from the description below, the mobile computing device 102 can upload data to the remote system 212 so that the remote system can generate 3D models based on the uploaded data, and the remote system 212 can download data to the mobile computing device 102 so that the remote computing device 202 can display 3D models to a user of the mobile computing device.

In accordance with certain embodiments, various features described herein can be performed under the control of an application that is downloaded to, stored on, and executed by the mobile computing device 102. For example, where the mobile computing device 102 is a smartphone or tablet computing device, various features described herein can be performed under the control of a mobile application, which is also known as a mobile app, or simply an app. Such a mobile application can be available for download from an application store or directly from a software vender, for free, or for a fee.

Figure 3:
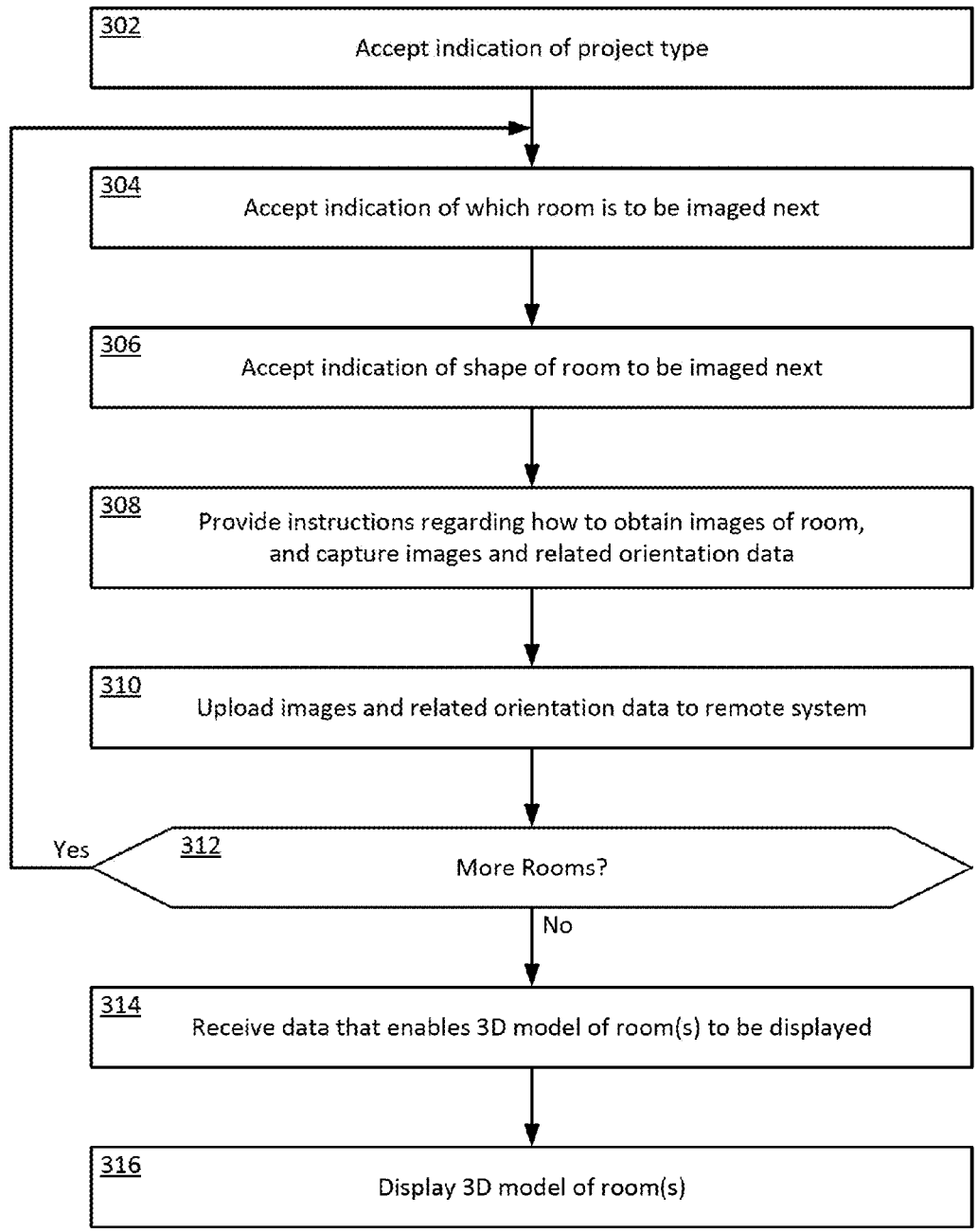
FIG. 3 is a high level flow diagram used to summarize various embodiments of the present invention that can be used to enable generation of three-dimensional models of rooms.

The high level flow diagram of FIG. 3 will now be used to summarize various embodiments of the present invention. For the purpose of this description, it is assumed that a mobile application capable of performing the steps described with reference to FIG. 3 has already been installed on, and executed by, the mobile computing device 102.

Figure 4:
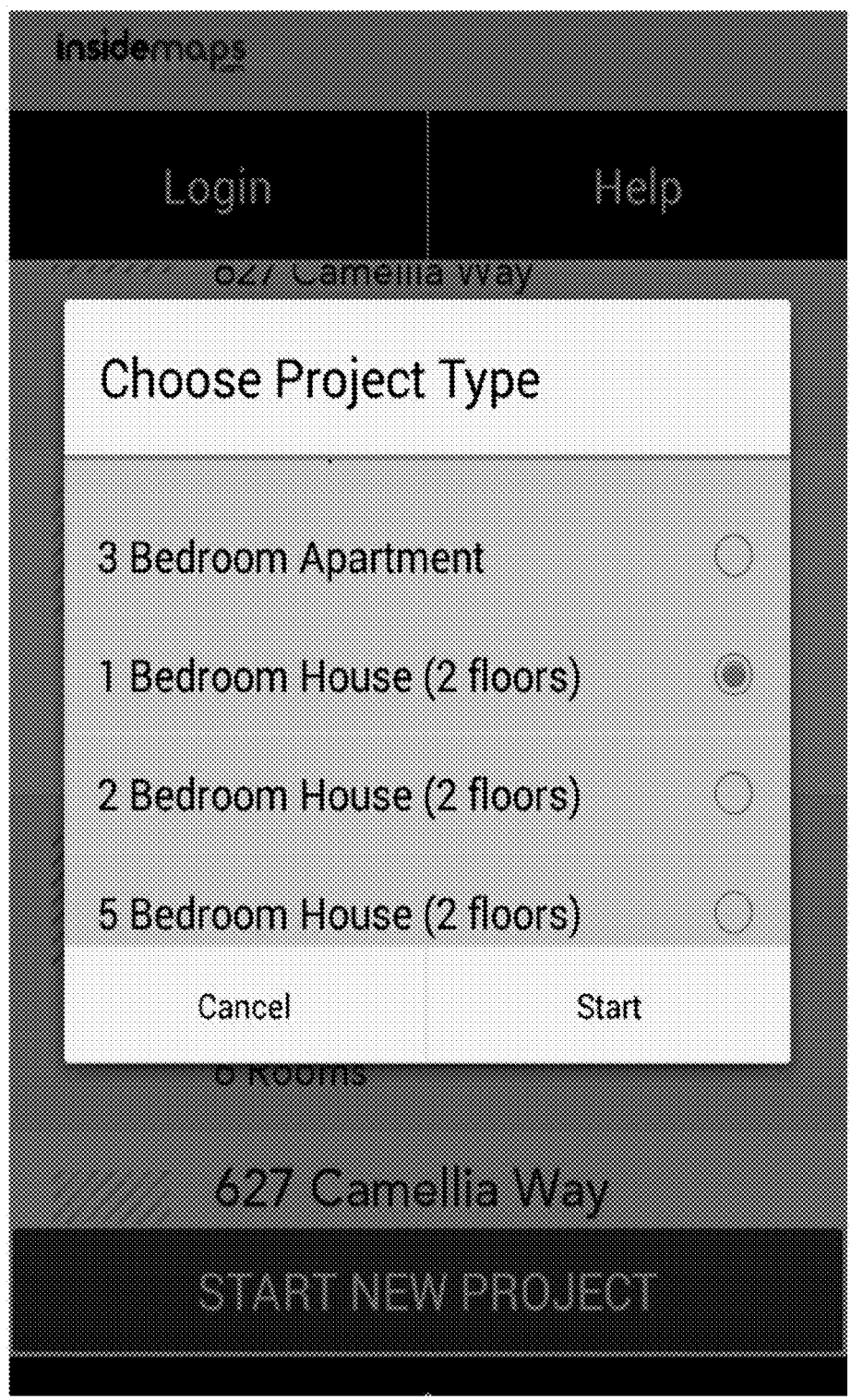
FIG. 4 illustrates an exemplary screen shot of a user interface that can be displayed on a display of a mobile computing device to implement one of the steps introduced in FIG. 3 to enable a user to indicate how many rooms are to be included in a three-dimensional model, and more generally, to indicate a type of project for which a three-dimensional model is to be generated.

Referring to FIG. 3, at step 302, an indication of a project type is accepted from a user, wherein the project type (which can also be referred to as a template) specifies how many rooms are to be included in a 3D model, or more generally, in a project. Step 302 can be achieved by presenting project options to the user on the display 114 of the mobile computing device 102, e.g., as shown in the exemplary screen shot illustrated in FIG. 4. A predetermined list of the most likely projects can be presented to the user. The application can assume that each project includes one kitchen, and can predict how many bathrooms are included in the project based on a number of bedrooms included in the project. The interface can also allow a user to add rooms to a project and/or remove rooms from a project. Additionally, or alternatively, an interface can allow the user to define and select a custom project. The user can also be allowed to enter a name for the project, such as, "Summer Home" or "Dave's College Dorm Room." Additionally, or alternatively, the user can be allowed to enter an address for the project.

The terms "imaging" and "capturing", as used herein, are used interchangeably typically to refer to the obtaining or taking of images using a camera of a mobile computing device. Further, if a room (or a portion thereof) has already been "imaged" or "captured", that means images for that room (or a portion thereof) have already been obtained using the mobile computing device.

Figure 5:
FIG. 5 illustrates an exemplary screen shot of a user interface that can be displayed on a display of a mobile computing device to implement one of the steps introduced in FIG. 3 to enable a user to select a room that is to be imaged next.

To produce 3D models of each of the rooms in the project using SfM techniques, a plurality of images of each of the rooms to be modeled must be obtained. Accordingly, at step 304, an indication of which one of the rooms is to be imaged (i.e., captured) next is accepted. In other words, at step 304, the mobile computing device 102 is used to accept an indication, from the user, of which room the user is about to take images of using the camera 104 of the mobile computing device 102. Step 304 can be achieved, for example, by presenting room options to the user on the display 114 of the mobile computing device 102, and accepting a selection of one of the options. FIG. 5 illustrates an exemplary screen shot of a user interface, displayed on the display 114 of the mobile computing device 102, which enables a user to select the room that is to be imaged next. In this example, the user selects which room to be imaged next by pressing one of the "capture" buttons. In certain embodiments, the color or shading of the "capture" button for a room that has not yet been imaged will be different from the color or shading of the "capture" button for a room that has already been imaged. For example, the capture buttons corresponding to rooms that still need to be imaged can be blue, and the capture buttons corresponding to rooms that have already been imaged can be green. This is just an example that is not meant to be all encompassing.

As can be seen in FIG. 5, images of an outside area, such a screened-in porch or a deck may also be obtained using embodiments of the present invention. For the purpose of this description, each such outside area can be considered a room, albeit an outdoor or exterior room, as opposed to an interior room.

Figure 6:
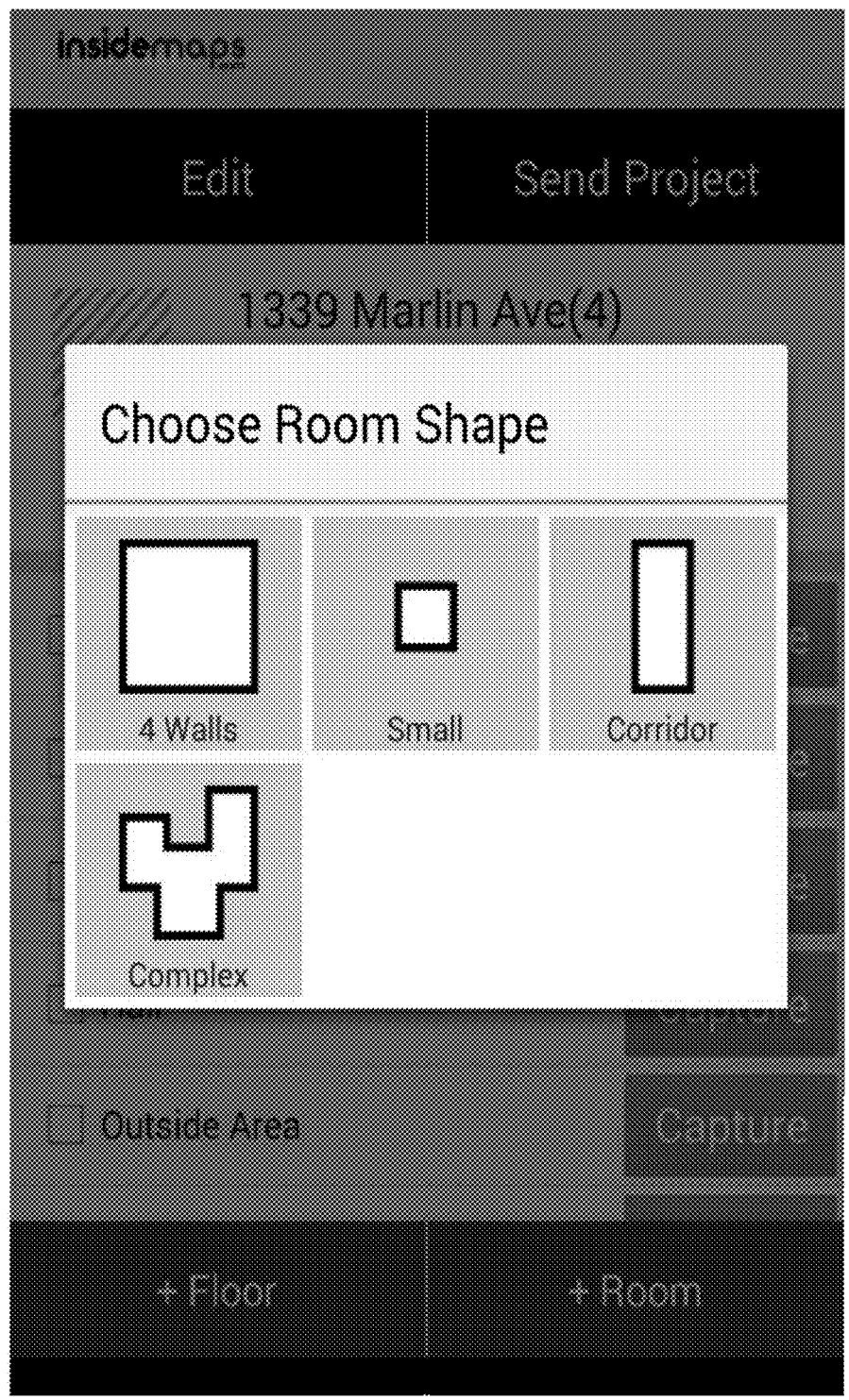
FIG. 6 illustrates an exemplary screen shot of a user interface that can be displayed on a display of a mobile computing device to enable a user to select the shape of a room that is about to be imaged.

At step 306, an indication of the shape of the room to be imaged is accepted. In other words, at step 306, the mobile computing device 102 is used to accept an indication, from the user, of the shape of the room that the user is about to take images of using the camera 104 of the mobile computing device 102. Step 306 can be achieved, for example, by presenting pre-defined shape options to the user on the display 114 of the mobile computing device 102, and accepting a selection of one of the options. FIG. 6 illustrates an exemplary screen shot of a user interface, displayed on the display 114 of the mobile computing device 102, which enables a user to select the shape of the room that is about to be imaged. Many more room shapes than those shown in FIG. 6 are possible. For example, other room shapes include L-shaped rooms, U-shaped rooms and T-shaped rooms, etc. It is also possible that a user interface allows the user to define a custom shaped room, e.g., if none of the predefined rooms shapes is similar to the room that a user wants to image. In accordance with an embodiment, the screen shot illustrated in FIG. 6 will appear in response to a user pressing one of the "capture" buttons shown in the screen shot illustrated in FIG. 5. A user can select one of the room shapes shown in FIG. 6, e.g., by tapping on one of the room shapes shown.

Referring again to FIG. 3, at step 308 instructions are provided to the user regarding how to obtain images of the room, and as the user follows the instructions, images of the room are captured along with orientation data corresponding to the images. Additional details of step 308 are described below with reference to the flow diagram of FIG. 7 and the screen shots illustrated in FIGS. 8A, 8B and 9. The specific instructions provided to the user will depend on which room shape was selected at step 306. For example, referring again to FIG. 6, there can be different instructions for imaging a typical four walled room, for imaging a small four walled room (e.g., such as a bathroom where it may not be possible for a user to stand next to each of the walls), for imaging a corridor (which is typically narrower but potentially longer than a typical four walled room), and for imaging a more complexly shaped room.

Referring again to FIG. 3, at step 310, obtained images and orientation data corresponding to the images are uploaded to a remote system (e.g., 212 in FIG. 2) that includes SfM software and sufficient processing resources to generate a 3D model of a room based on images of the room within a relatively short period of time. Preferably, the images and corresponding orientation data for a room are uploaded to the remote system as soon as all of the images for the room are obtained, so that the remote system can begin to generate a 3D model of the room while images of a next room are being obtained by the user using the mobile computing device 102. It would also be possible to begin uploading images and corresponding orientation data for a room, to the remote system, before all of the images and corresponding orientation data are obtained for the room. Alternatively, the uploading can be initiated after all the images and corresponding orientation data are obtained for all of the rooms of the project.

At step 314, after the remote system uses SfM software to generate 3D models of the rooms that have been imaged by the mobile computing device 102, data that enables 3D models to be displayed on the mobile computing device 102 is downloaded to the mobile computing device 102. Using such data and the mobile application, the mobile computing device 102 can display 3D models of the rooms, as indicated at step 316.

As indicated by decision block 312, steps 304, 306, 308 and 310 are repeated for each of the rooms that are to be modeled. Preferably, if images and corresponding orientation data are uploaded for a first room before a second room is imaged using the mobile computing device 102, the remote system can begin generating the 3D model of the first room while the second room is being imaged. This way, if the remote system completes the 3D model of the first room, before the second room (or some later room, e.g., a third room) is completely imaged, data that enables a 3D model of the first room to be displayed on the mobile computing device 102 can be downloaded, and the user can view the 3D model of the first room before the user finishes imaging other rooms of the project. In other words, instances of steps 314 and 316 can be interleaved with instances of steps 304-310.

Figure 11:
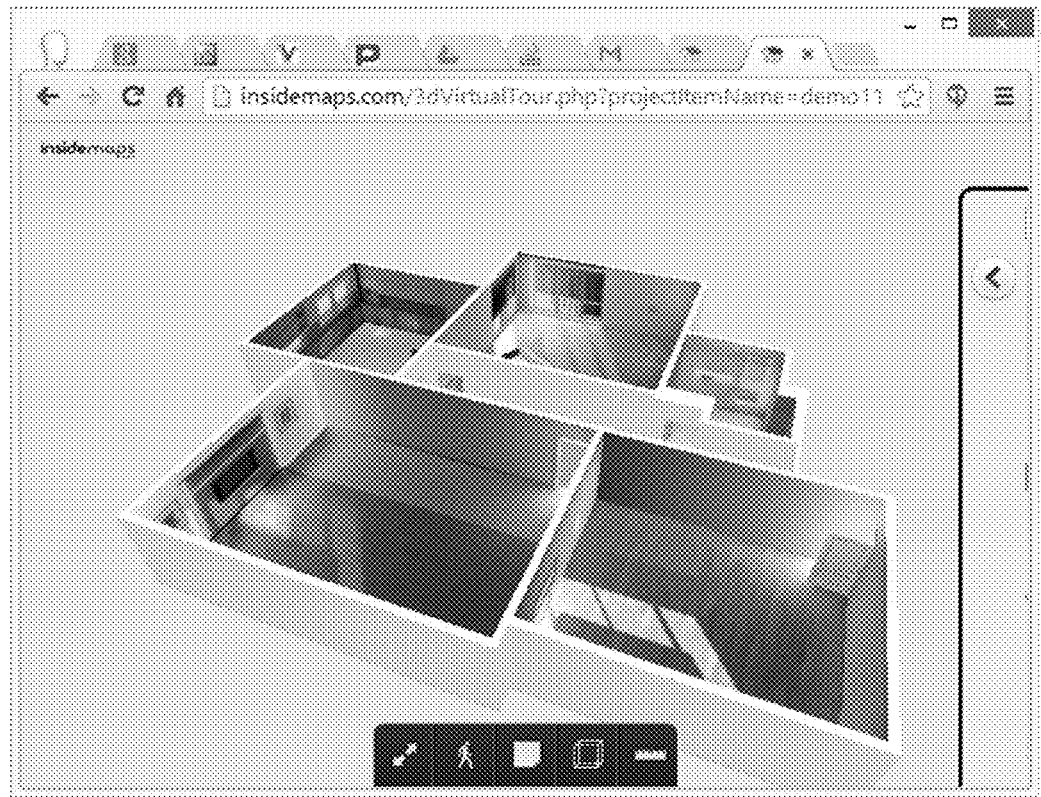
FIG. 11 illustrates an exemplary screen shot of a three-dimensional model generated using embodiments described herein displayed on a display of a mobile computing device.

FIG. 11 illustrates an exemplary screen shot of a 3D model as displayed on the display 114 of the mobile computing device 102. In accordance with an embodiment, the 3D model is actually hosted by the remote system 212, e.g., on a web-server, and the mobile computing device 102 can be used to observe and manipulate the 3D model using a web-browser installed on the mobile computing device 102. In such an embodiment, step 314 can be achieved by receiving data that specifies a link to the web page through which the 3D model can be observed. In a specific embodiment, the mobile computing device can automatically pull up the browser and link to the correct web page in response to receiving the data received at step 314. The user can also forward web page links to other people (e.g., an interior designer, or an architect) so that such other people can similarly use a web browser to observe the 3D model. The user may also access the web page using some other computing device, which may or may not be a mobile computing device. The 3D model can be used, e.g., to view virtual furniture at different locations within a room, view how carpets or rugs may look in a room, view how walls may look if repainted or removed, and the like.

Additional details of step 308 will now be described with reference to the high level flow diagram of FIG. 7 and the screen shots illustrated in FIGS. 8A, 8B and 9.

Figure 7:
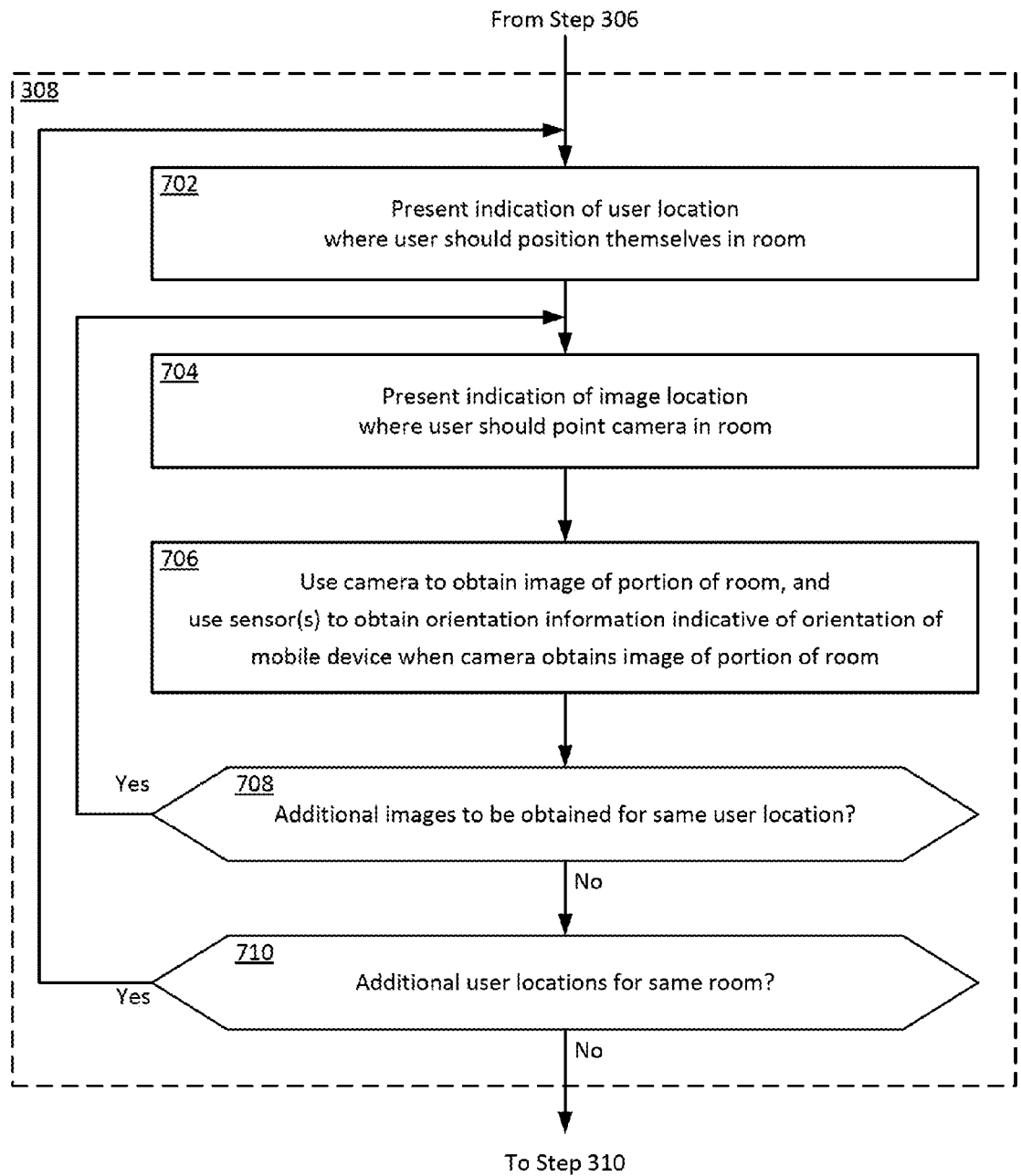
FIG. 7 is a high level flow diagram that is used to provide additional details of one of the steps introduced in FIG. 3, according to an embodiment, that involves providing instructions to a user regarding how to obtain images of a room, and as the user follows the instructions, captures images of the room along with orientation data corresponding to the images.

Referring to FIG. 7, an indication of a user location, where the user holding the mobile computing device should position themself in a room (including a plurality of walls), is provided at step 702. Such an indication can be based at least in part of the shape of the room, which was input to the application at step 306 discussed above with reference to FIG. 3. Additionally, an indication of an image location where the user (once positioned at the indicated user location) should point the camera of the mobile computing device 102, is provided at step 704. Such indicators, which can also be referred to respectively as the user location indicator and the image location indicator, can be presented on the display 114 of the mobile computing device 102, as shown in the exemplary screen shot in FIG. 8A. As the phrases are used herein, point the camera and aim the camera are used interchangeably.

Figure 8A:
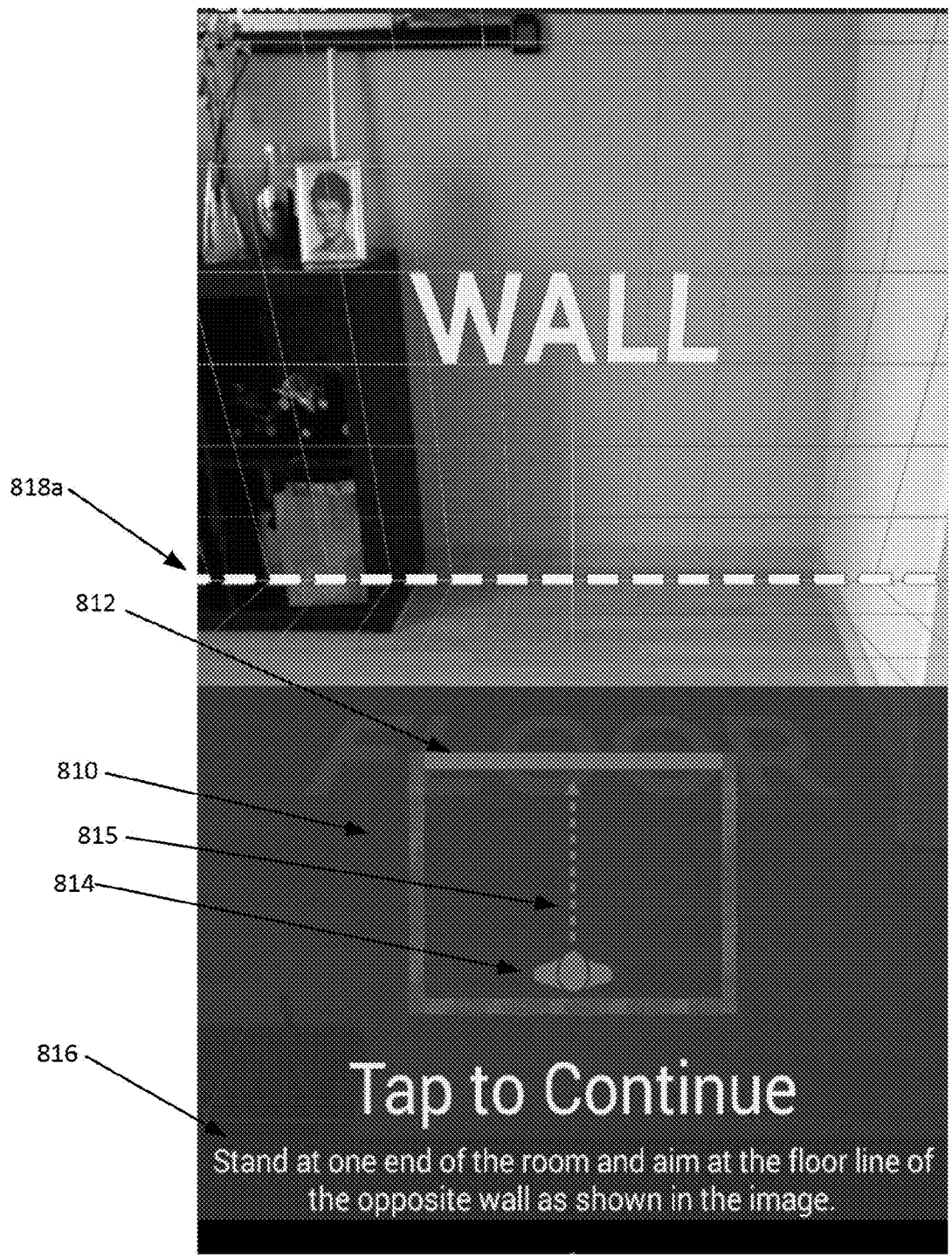
FIGS. 8A and 8B illustrate exemplary screen shots of a user interface that can be displayed on a display of a mobile computing device to provide an indication of a user location, where a user holding the mobile computing device should position themself in a room, and also provides an indication of an image location where the user should point the camera of the mobile computing device.
Figure 8B:
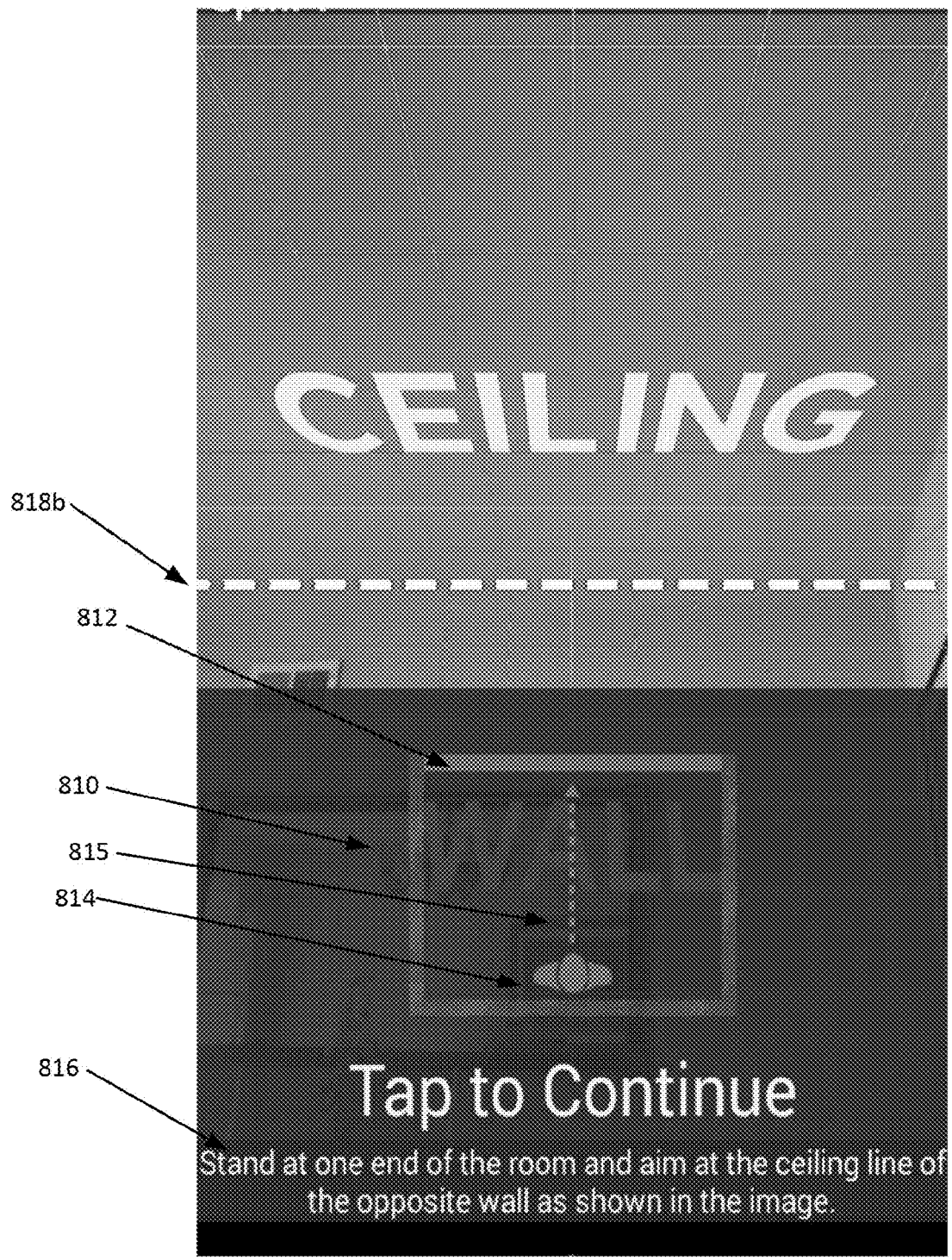

Referring briefly to FIG. 8A, the bottom portion of the screen shot includes a representation 810 of the room being imaged, which in this example, is a room having four walls. If a room having a different shape was being imaged, then the representation 810 would have that different shape (e.g., an L-shaped room having six walls and six corners). In FIG. 8A, one of the four walls, labeled 812, is highlighted to indicate which wall is to be imaged next, e.g., by coloring and/or shading that wall differently than the other three walls, and/or causing that wall to blink, or the like. Also shown is a representation, labeled 814, of where the user is to stand relative to the wall (labeled 812) this is about to be imaged. Elements 810 and 814 in FIG. 8A are examples of the aforementioned user location indicator. Other user locations indicators are also possible and within the scope of an embodiment. For example, user location indicators can alternatively be graphical representations a pair of footprints, shoeprints, feet or shoes, but are not limited thereto.

In the example shown in FIG. 8A, textual instructions 816 are also provided, which instruct the user to "stand at one end of the room and aim at the floor line of the opposite wall as shown in the image." Additionally, or alternatively, similar instructions can be verbally provided using the speaker 122 of the mobile computing device 102. It is also possible that textual or verbal instructions are not present, since the graphical user interface is otherwise intuitive enough for the user to know where to position themself and point the camera. Alternatively, textual and/or verbal instructions may only be provided in response to the user requesting help, e.g., by pressing a help button or speaking the word help are some other specified term or phrase.

Also shown is a dashed arrow, labeled 815, which graphically illustrates the direction the user should face. Additionally, a dashed horizontal line, labeled 818a, which is presented above the word "floor" and below the word "wall", aids the user with aiming the camera at a floor line, wherein the floor line is the horizontal line that separates a wall from the floor. Elements 815, 812 and 818a in FIG. 8A are examples of the aforementioned image location indicator. Not all such indicators need be used. The displayed words "floor" and "wall" can also be considered part of an image location indicator together with the dashed line 818a. It is also within the scope of an embodiment that alternative and/or additional image location indicators be used.

The user can be instructed to tap on the display or provide some other indication of when they have positioned themself at the specified user location and aimed the camera at the specified image location. In response to receiving such an indication from the user, the camera 104 is used to obtain an image of the portion of the room within the field of view of the camera, and one or more sensors are used to obtain orientation information indicative of an orientation of the mobile device when the camera obtains the image of the portion of the room, as indicated at step 706 in FIG. 7. Preferably, if the mobile computing device 102 includes an accelerometer, magnetometer and gyroscope, labeled 106, 108 and 110 respectively in FIG. 1, then information from each of these sensors is obtained. If only one or two of those sensors are included in the mobile computing device 102, then preferably information from each of the included ones of those sensors is obtained.

At step 708 there is a determination of whether there are any additional images to be obtained (e.g., corresponding to one or more additional image locations) while the user is at the present user location. If the answer to the determination at step 708 is yes, then flow returns to step 704 and a different image location indicator is presented to the user, while the user position indicator remains the same. For example, referring to FIG. 8B, the dashed horizontal line, labeled 818b, which is presented above the word "wall" and below the word "ceiling", aids the user with aiming the camera at a ceiling line, wherein the ceiling line is the horizontal line that separates a wall from the ceiling. Accordingly, in FIG. 8B, the indicators 812, 815 and 818b are examples of the aforementioned image location indicator. The displayed words "floor" and "wall" can also be considered part of an image location indicator together with the dashed line 818b. More specifically, the indicators 812, 815 and 818b are examples of graphical image location indicators, and the words "floor", "wall" and "ceiling" are examples of textual image location indicators.

Note that not all of the indicators are always changed, i.e., in this example the indicators 812 and 815 remained the same (as compared to in FIG. 8A) since it is still the same wall being imaged, albeit a different portion of that same wall. Again, the user can be instructed to tap on the display or provide some other indication of when they have aimed the camera at the further specified image location. In response to receiving such an indication from the user, the camera 104 is used to obtain an image of the portion of the room within the field of view of the camera, and one or more sensors are used to obtain orientation information indicative of an orientation of the mobile device when the camera obtains the image of the portion of the room, as indicated at step 706 in FIG. 7.

Figure 10:
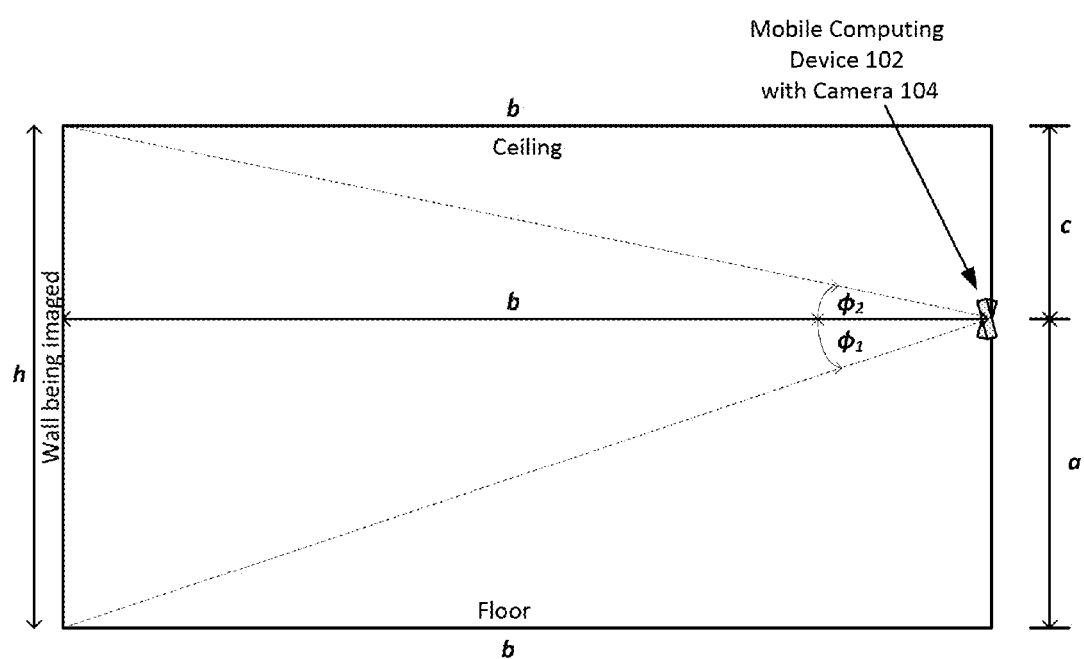
FIG. 10 is used to explain one technique that can be used to estimate the height of a wall in accordance with an embodiment.

In accordance with certain embodiments, the mobile application can estimate the height of the wall based on orientation information (obtained using the sensors 106, 108 and/or 110) that corresponds to images that were obtained while the camera 104 of the mobile computing device 102 was aimed at the floor line and the camera 104 was aimed at the ceiling line. Based on the estimated height of the wall, the mobile application can determine whether additional images of the wall that the user is currently facing need to be obtained before the user is instructed to move to the next user location. FIG. 10 is used to explain one technique that can be used to estimate the height of a wall, according to an embodiment, based on orientation information (obtained using the sensors 106, 108 and/or 110) that corresponds to images that were obtained while the camera was aimed at the floor line and the camera was aimed at the ceiling line. Referring to FIG. 10, the reference "a" illustrates a height of the mobile computing device used to obtain images. In other words, "a" is the height between the floor and the mobile computing device 102. The value for "a" can be a predetermined value that is based on an estimated average height of users (e.g., 5' 6", but not limited thereto). Alternatively, to increase accuracy, a user can be asked to enter their height, so that the value for "a" is more accurate, and thus, any calculation based on this value will be more accurate. Still referring to FIG. 10, $\phi_1$ is the angle of the mobile computing device 102 when the camera 104 of the mobile computing device 102 is aimed at the floor line that separates a wall from the floor, and $\phi_2$ is the angle of the mobile computing device 102 when the camera 104 of the mobile computing device 102 is aimed at the ceiling line that separates the wall from the ceiling. The angles $\phi_1$ and $\phi_2$ can be obtained using the accelerometer 106 and/or the gyroscope 110 included within the mobile computer device 102. The reference "b" is the distance from the mobile computing device 102 to the wall being imaged. The reference "c" is the height between the mobile computing device 102 and the ceiling. The reference "h" is the height of the wall being imaged, which is the height being estimated. In accordance with an embodiment, the following equations are used to estimate the height (h) of the wall being imaged:

$b=a/\tan(\phi_1);$ $c=b*\tan(\phi_2);$ and $h=a+c.$

It is also possible and within the scope of an embodiment that alternative equations can be used to estimate the height of a wall. In certain embodiments, if the calculated distance between the mobile computing device 102 and a first wall being imaged is not within an acceptable tolerance of the calculated distance between the mobile computing device 102 and a further wall being imaged, where the further wall is directly opposite the first wall, then the user can be instructed to repeat certain steps and retake certain images. In other words, there can be a self-check to determine whether the user is accurately following instructions, and if they are not, the user can be instructed to repeat certain steps and retake certain images.

In accordance with certain embodiments, after the user is instructed to stand near one of the walls and use the camera 104 to obtain images of the opposite wall (as just described above), the user will then be instructed to move to one of the two corners of the room defined in part by the wall the user was standing near. The mobile application can achieve this, e.g., by the moving the user representation 814 shown in FIG. 8A to one of the corners of the room representation 810. At this point, a different graphical user interface may be displayed on the screen of the mobile computing device, an example of which is shown in the screen shot illustrated in FIG. 9.

Figure 9:
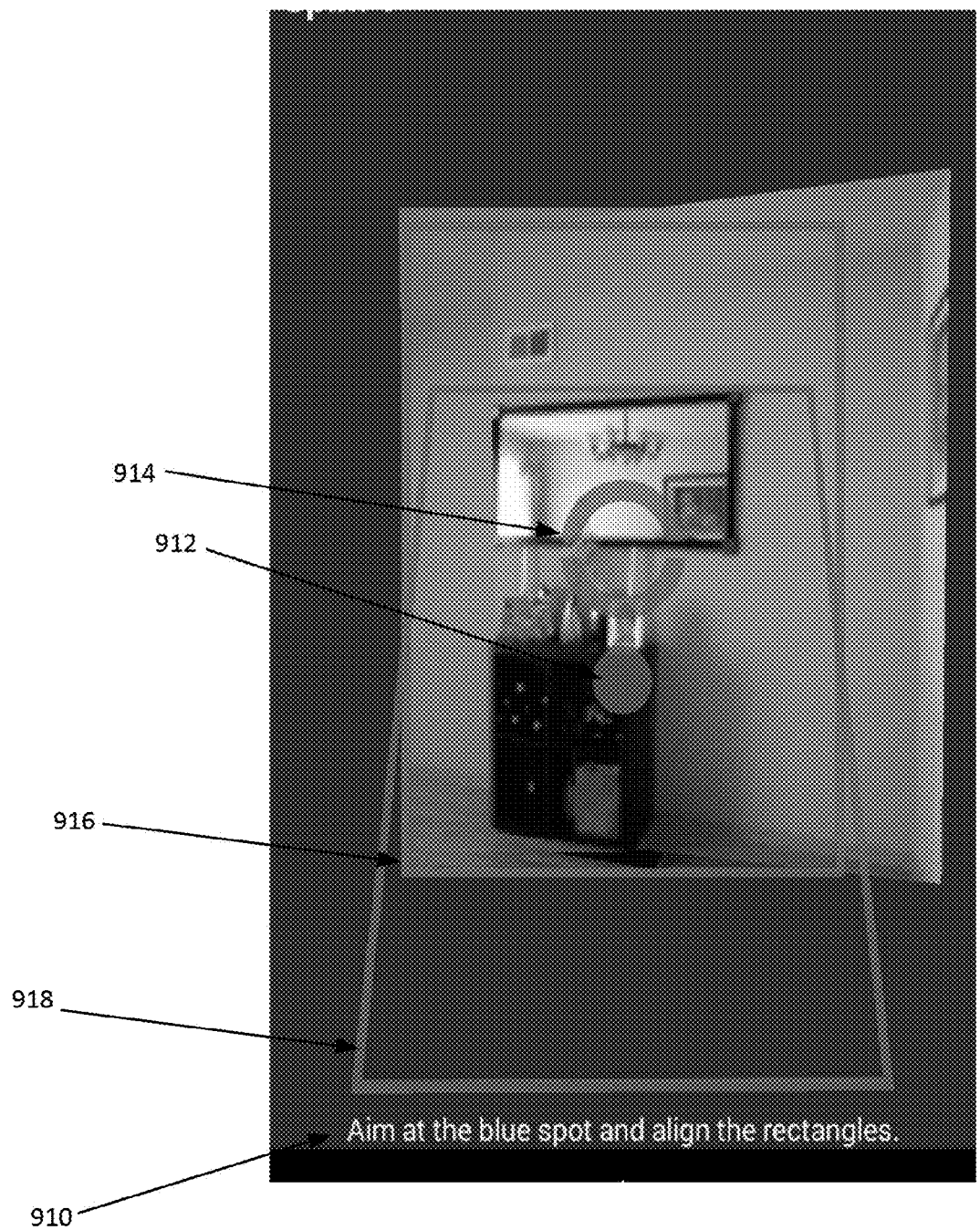
FIG. 9 illustrates an exemplary screen shot of a user interface that can be displayed on a display of a mobile computing device, wherein the screen shot includes an aiming indicator, a target indicator and an angle indicator that is used to instruct a user how they are supposed to maneuver the mobile computing device to enable additional images of a room to be obtained in accordance with an embodiment.

Referring to FIG. 9, textual instructions 910, which are provided at the bottom of the screen, instruct the user to "aim at the blue spot and align the rectangles". Here, the user is supposed to maneuver the mobile computing device so that an aiming indicator 912 (illustrated as a dot) is located within a target indicator 914 (illustrated as two semi-circles), and the angle indicators 916 and 918 (illustrated as rectangles) are aligned with one another. Alternative graphical representations of the aiming indicator, target indicator and angle indicators are also possible, and within the scope of an embodiment. In FIG. 9, the indicators 912, 914, 916 and 918 are further examples of the aforementioned image location indicators. The displayed words "aim at the blue spot and align the rectangles" can also be considered part of an image location indicator together with the elements 912, 914, 916 and 918. More specifically, the indicators 912, 914, 916 and 918 are examples of graphical image location indicators, and the words "aim at the blue spot and align the rectangles" are an example of a textual image location indicator.

In accordance with an embodiment, the mobile computing device 102 will recognize when the aiming indicator 912 is located within the target indicator 914, and the angle indicators 916, 918 are aligned with one another, and the mobile computing device 102 will automatically activate the camera 104 to obtain an image at that point. In an alternative embodiment, the user will activate the camera 104, e.g., by tapping anywhere on a touchscreen or pressing a specific button. After the image is taken, the target indicator 914 moves if there are more images that need to be taken while the user is located in that corner, and the above process is repeated until all images that need to be obtained (while the user is in their current user position) are actually obtained. This essentially results in a fan of images that partially overlap one another being obtained. The locations of the target indicator are determined by the mobile application, and thus, the user need just follow the instructions provided to them to thereby enable the mobile computing device to obtain all of the images that are needed to produce 3D models of rooms. In certain embodiments, the number of different locations that the target indicator 914 will be located will depend on the shape of the room and the height of the walls within the room.

In accordance with certain embodiments, the user interface of the mobile computing device will inform a user if and when they need to hold the mobile computing device more steadily, to increase the probability that the images obtained using the camera of the mobile computing device are not blurry. The mobile computing device can determine how steady it is being held based on information from its sensors (e.g., 106 and/or 110). In certain embodiments, the mobile computing device will only obtain an image when it determines that it is being held sufficiently steady. It is also possible that the user can be instructed to retake a certain image when the mobile computing device determines, e.g., using its sensor or based on an analysis of an image, that a previously obtained image was too blurry.

For a simply four walled room, the user positions can be, for example, as follows: first wall; first corner; second wall; second corner, third wall; third corner; fourth wall; fourth corner. For an L-shaped room the user positions can be, for example, as follows: first wall; first corner; second wall; second corner; . . . sixth wall; sixth corner. In an alternative embodiment, rather than instructing the user stand in the various corners of a room, the user may be instructed to stand near the middle of the room, and a target indicator may be used to instruct the user to essentially incrementally spin in a circle while images are obtained using the camera of the mobile computing device 102.

Referring again to FIG. 7, when there are no additional images to be obtained for a specific user location, then the user will be instructed to move to a different user position, as can be appreciated from steps 708, 710 and 702. This procedure is repeated, as can be appreciated from the flow diagram in FIG. 7, until there are no additional combinations of user locations and image locations for which images and corresponding orientation data are to be obtained for the room.

In accordance with specific embodiments, the above procedure will be used to obtain, for each of the plurality of walls in the room, one image where the image location indicator (e.g., dashed line 818*a* in FIG. 8A) is aligned with the floor line, and another image where the image location indicator (e.g., dashed line 818*b* in FIG. 8B) is aligned with the ceiling line. Preferably, each portion of each wall is included in at least three images, to enable accurate triangulation of each portion of each wall. Preferably each of the images overlaps with at least two neighboring images. In certain embodiments, each of the images vertically overlaps at least one neighboring image, and horizontally overlaps at least one further neighboring image.

The orientation data corresponding to each image is an example of metadata corresponding to each image. For example, such metadata can include information obtained from the accelerometer 106, the magnetometer 108 and/or the gyroscope 110. The metadata can also include camera exposure settings (e.g., exposure time and aperture setting) and/or ambient light levels corresponding to each image. Non-sensor type metadata can also be associated with each image. For example, each of the images can be numbered and/or time stamped. In other words, the metadata for each image can include an image number and/or a time stamp.

Each captured image should preferably overlap with at least one other image, and likely with at least two other images, to ensure that there are no portions of the walls that have not been captured in the images of a room. To enable the SfM software to generate 3D models of rooms more efficiently, the metadata for an image can also identify the other image(s) that the image overlaps with. In this manner, the metadata can be used to avoid perceptual aliasing. The metadata for an image can also include information about the wall included in the image and the room of which the wall is a part.

For another example, the metadata for each image can include the project name and/or the room name. One of ordinary skill in the art reading this disclosure would appreciate that alternative and/or additional types of metadata can be associated with each of the images.

In accordance with certain embodiments, approximately 20 to 30 images of each wall in a room with obtained. However, it is also possible that less than 20 or more 30 images can be obtained for each wall.

In accordance with certain embodiments, the mobile computing device monitors lighting conditions and/or exposure settings used when the camera obtains images, and the mobile computing device under control of the mobile application may take additional exposure brackets at uneven light levels, e.g., caused by windows, lamps or skylights. This reduces the probability that the only images of a particular portion of a room are underexposed or overexposed.

Referring back to FIG. 3, the determinations, at step 312, whether there is/are any additional room(s) to capture, ensure that no rooms of the project (indicated at step 302) are accidentally skipped by the user. Referring back to FIG. 7, the determinations at step 708 and 710 similarly ensure that there are no walls, or portions thereof, that are accidentally skipped by the user. In accordance with one embodiment, the user obtaining the images will not be able to view a 3D model generated based on the images until after images of all of the rooms of a project, and all of the walls within each room, have been obtained and uploaded to the remote system. In other embodiments, the user will be able to view a 3D model for any room that has already had all of its walls imaged and uploaded to the remote system. In accordance with certain embodiments, the user can be given the option to skip capturing a room of a project. In accordance with other embodiments, the user will not be given the option to skip capturing a room of a project. In accordance with certain embodiments, the user is informed of any rooms, walls and/or portions thereof that were skipped, and they are instructed to return to the skipped rooms and walls to obtain images thereof The SfM software and the hardware (e.g., one or more servers) executing the software can collectively be referred to as a SfM engine. Typically, a SfM engine only uses about 30% of the images it accepts to generate 3D models. By contrast, because the mobile applications described herein primarily only obtains images that are actually useful for generating 3D models, and minimizes redundant images, a SfM engine will likely use over 90% of the images it receives from the mobile computing device 102.

Figure 12:
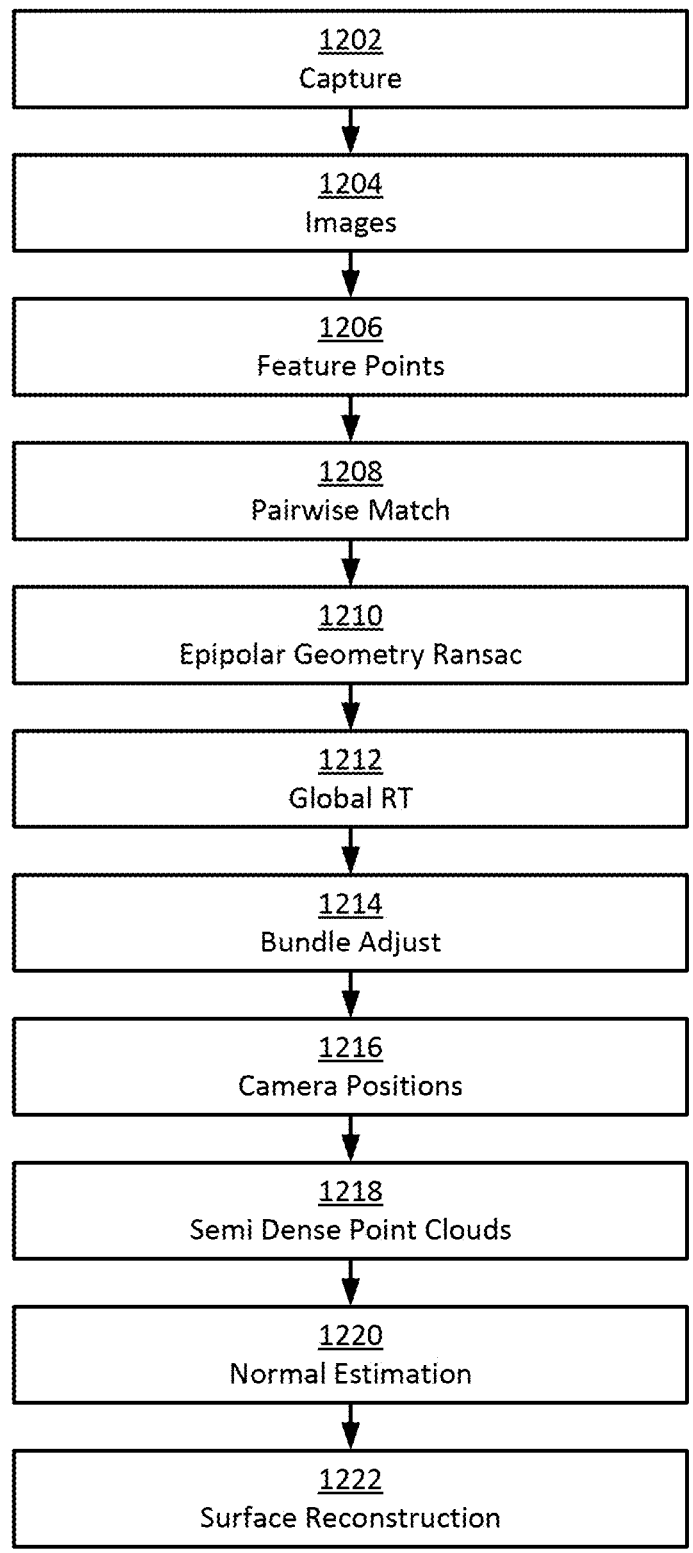
FIG. 12 illustrates an exemplary structure from motion pipeline that can be used to generate three-dimensional models of rooms from images.

FIG. 12 illustrates an exemplary SfM pipeline that can be used to generate 3D models of rooms from images. Embodiments of the present invention primarily relate to the capture stage 1202, which results in images 1204. The remaining stages in the pipeline, which are not the subject of the embodiments of the present invention, are likely implemented by the SfM engine hosted by the remote system 212. Nevertheless, for completeness, a description of the exemplary SfM pipeline shown in FIG. 12 is provided herein. Steps or stages 1206-1222 can be performed or realized using one or more processors executing software. The images 1204 are provided to a feature point extractor stage 1206, which can extract feature points from the images that enable common areas in different images to be matched to one another by a pairwise match stage 1208. Feature point extraction can be performed, e.g., using a scale-invariant feature transform (or SIFT), which is an algorithm in computer vision used to detect and describe local features in images. Feature points are areas of the images that can be classified and described such that a same area can be detected and matched in more than one image. Exemplary feature points include, but are not limited to, corners and blobs. The pairwise matching stage 1208 can be used to match features between pairs of images. When images are pairwise matched, each image can be pairwise matched to all other images, or if certain structure of the capture is known they can be pairwise matched to a smaller subset of the other images. For example, metadata associated with images can be used to reduce the pairwise matching that is performed, e.g., to eliminate pairwise matching of images of walls that are located in completely different rooms. Matching can then be refined using an epipolar geometry random sample consensus (RANSAC) stage 1210, e.g., to estimate fundamental matrices between pairs of images. For example, stage 1210 can involve simultaneously calculating the motion between the images and the positions of feature points in 3D space, where two cameras define an epipolar geometry that can also be used to eliminate mismatches. Once the motion between the image pairs are determined, an overall global motion can be calculated from the pairwise estimations of movement, which includes both rotation (R) and translation (T), at a global RT stage 1212. At a bundle adjust stage 1214, a bundle adjustment can be performed to increase accuracy, e.g., by reducing and preferably minimizing re-projection errors. A bundle adjustment is a type of non-linear optimization that can be performed, e.g., using the Levenberg-Marquardt algorithm (LMA), which is also known as the damped least-squares (DLS) method. Results of the global RT stage 1212 and bundle adjustment stage 1214 include camera positions 1216. A semi-dense point clouds stage 1218 uses the calculated camera positions to create a semi dense point cloud, e.g., using a stereo method of calculating disparity that relies on a sum of absolute differences (SAD) algorithm. At stage 1220, semi dense point cloud normals can be estimated. At stage 1222, the normals and the semi dense point cloud can be recreated, e.g., using a Poission surface reconstruction. The description of FIG. 12 was only included to describe an example of an SfM pipeline. Alternatively SfM pipelines, or more generally, alternative algorithms for generating 3D models based on captured images can be used.

Referring again to FIG. 2, the remote system 212, while attempting to generate a 3D model, may determine that certain images beneficial or necessary to generating the model are missing. In such a case the remote system 212 may inform the mobile computing device 102 of the missing images, in response to which the user can be instructed to obtain the missing images.

The images that are obtained using the camera 104 of the mobile computing device 102 can be monocular images, which is the type of images that are typically obtained using most smartphones and tablets. Alternatively, the images that are obtained using the camera 104 of the mobile computing device 102 can be binocular images, stereo images or depth images, but are not limited thereto. In order to obtain binocular or stereo images, the camera 104 may need to include at least two image sensors that are spaced apart from one another. The camera 104 of the mobile computing device can include, e.g., a CMOS or CCD image sensor(s) that enables colored images, which are sometimes referred to as RGB or RGBA images, to be obtained. Such images can be stored, e.g., in the JPEG file format, or some alternative file formal, such as, but not limited to, Exif, TIFF, RAW, GIF, BMP, PNG, PPM, PAM, or WEBP. It is also within the scope of an embodiment that the camera 104 can be a depth camera that uses structure light or time-of-flight to obtain depth images, which are sometimes referred to as z-depth images or simply z-images. Miniature depth cameras that can be incorporated into mobile computing devices are commercially available, for example, from the company PrimeSense™, headquartered in Tel-Aviv Israel. It is also possible that the images are RGBD images, which can be produced by combining an RGB image and a depth image. It is also possible that binocular or stereo depth images are obtained. The use of other types of cameras and other types of images are also possible, and within the scope of embodiments of the present invention. Any of the above mentioned types of images can be used to generate 3D models using a SfM engine. It is also possible that a mobile computing device can include more than one type of camera, and thus, can obtain more than one type of images. In such a case, a SfM engine that receives images from the mobile computing device can generate 3D models using different types of images, or just a single type of images.

Preferably, embodiments of the present invention can be used to obtain all the images necessary for generating a 3D model of one room in five minutes or less, and preferably in about two minutes, such that all the images need generate a 3D model of a ten room building can be obtained in about twenty minutes.

While various embodiments of the present invention have been described above, it should be understood that they have been presented by way of example, and not limitation. It will be apparent to persons skilled in the relevant art that various changes in form and detail can be made therein without departing from the spirit and scope of the invention.

What is claimed:

1. For use by a mobile computing device that includes a camera configured to obtain images and at least one sensor configured to obtain orientation information for the mobile computing device, a method for enabling generation of three dimensional (3D) models of one or more rooms, the method comprising:

(a) presenting, to a user holding the mobile computing device, (a.i) at least one user location indicator that provides an indication of where the user should position themself in a room including a plurality of walls, wherein the at least one user location indicator comprises a representation of a room being imaged, an indication of which particular wall of the room is to be imaged, and a representation of where the user is to stand relative to the particular wall that is to be imaged; and (a.ii) at least one image location indicator that provides an indication of where the user, once positioned at the indicated user location, should point the camera of the mobile computing device;

(b) in response to receiving an indication that the user holding the mobile computing device is positioned at the indicated user location and pointing the camera at the indicated image location, (b.i) using the camera of the mobile computing device to obtain an image of a portion of the room, and (b.ii) using the at least one sensor to obtain orientation information indicative of an orientation of the mobile device when the camera obtains the image of the portion of the room, (c) repeating steps (a) and (b) a plurality of times so that images and corresponding orientation information are obtained for each of the plurality of walls of the room; and (d) transferring the obtained images and corresponding orientation information from the mobile computing device to a remote system that is configured to generate 3D models of rooms based on images.

2. The method of claim 1, wherein steps (a) and (b) are repeated until images and corresponding orientation information are obtained for each of the plurality of walls of the room, and so that each image partially overlaps with at least two other images.

3. The method of claim 1, further comprising:
(f) receiving, from the remote system, data that enables the mobile computing device to display a 3D model of the room to the user.

4. The method of claim 1, wherein steps (a) through (d) are performed for each of a plurality of rooms of a project.

5. The method of claim 4, further comprising:
(f) receiving, from the remote system, data that enables the mobile computing device to display a 3D model of the plurality of rooms to the user.

6. The method of claim 5, wherein the data that is received from a remote system at step (d) comprises data that specifies a link to a web page through which the 3D model of the plurality of rooms can be observed.

7. The method of claim 1, wherein the at least one sensor, which is configured to obtain orientation information for the mobile computing device, comprises at least one of an accelerometer, a magnetometer or a gyroscope.

8. The method of claim 1, wherein at (a.i) the presenting at least one user location indicator that provides an indication where the user should position themself in a room including a plurality of walls comprises displaying, on a display of the mobile computing device, a highlighted wall indicating which wall of the room is to be imaged, and a representation of where the user is to stand relative to the highlighted wall that is to be imaged.

9. The method of claim 1, wherein at (a.ii) the presenting at least one image location indicator that provides an indication where the user, once positioned at the indicated user location, should point the camera of the mobile computing device comprises displaying, on a display of the mobile computing device:
a first type of image location indicator that includes a graphical horizontal line that is to be aligned with a horizontal line that separates a wall from a floor; and
a second type of image location indicator that includes a graphical horizontal line that is to be aligned with a horizontal line that separates a wall from a ceiling.

10. The method of claim 1, wherein at (a.ii) the presenting at least one image location indicator that provides an indication where the user, once positioned at the indicated user location, should point the camera of the mobile computing device comprises displaying, on a display of the mobile computing device, an aiming indicator, a target indicator and an angle indicator.

11. One or more processor readable storage devices having instructions encoded thereon which when executed cause one or more processors of a mobile computing device to perform a method for enabling generation of three dimensional (3D) models of one or more rooms, the method comprising:
displaying user location indicators and image location indicators on a display of the mobile computing device, wherein the user location indicators comprise for each of a plurality of walls of each of one or more rooms, a representation of the room being imaged, an indication of which particular wall of the room is to be imaged, and a representation of where the user is to stand relative to the particular wall that is to be imaged;
obtaining images and corresponding orientation information for each of the plurality of walls of each of the one or more rooms using a camera of the mobile computing device and at least one sensor of the mobile computing device;
transferring the obtained images and corresponding orientation information from the mobile computing device to a remote system that is configured to generate 3D models of rooms based on images; and
receiving data that enables a 3D model of the one or more rooms to be displayed on the display of the mobile computing device.

12. The one or more processor readable storage devices of claim 11, wherein the image location indicators provide at least one indication of where the user, once positioned at one of the indicated user locations, should point the camera of the mobile computing device.

13. The one or more processor readable storage devices of claim 12, wherein the image location indicators comprise:
a first type of image location indicator that includes a graphical horizontal line that is to be aligned with a horizontal line that separates a wall from a floor; and
a second type of image location indicator that includes a graphical horizontal line that is to be aligned with a horizontal line that separates a wall from a ceiling.

14. The one or more processor readable storage devices of claim 12, wherein the image location indicators provide indications of where the user should point the camera of the mobile computing device and include an aiming indicator, a target indicator and an angle indicator.

15. The one or more processor readable storage devices of claim 11, wherein the at least one sensor, which is used to obtain orientation information for the mobile computing device, comprises at least one of an accelerometer, a magnetometer or a gyroscope.

16. For use by a mobile computing device that includes a camera configured to obtain images and at least one sensor configured to obtain orientation information for the mobile computing device, a method for enabling generation of three dimensional (3D) models of one or more rooms, the method comprising:
displaying user location indicators and image location indicators on a display of the mobile computing device, wherein the image location indicators comprise at least one of a first type of image location indicator including a graphical horizontal line that is to be aligned with a horizontal line that separates a wall from a floor, or a second type of image location indicator including a graphical horizontal line that is to be aligned with a horizontal line that separates a wall from a ceiling;
capturing images and obtaining corresponding orientation information for each of a plurality of walls of each of one or more rooms using a camera of the mobile computing device and at least one sensor of the mobile computing device;

transferring the obtained images and corresponding orientation information from the mobile computing device to a remote system that is configured to generate 3D models of rooms based on images; and receiving data that enables the mobile computing device to display a 3D model of the one or more rooms.

17. The method of claim 16, wherein the data that enables the mobile computing device to display a 3D model of the one or more rooms comprises data that specifies a link to a web page through which the 3D model of the one or more rooms can be observed.

18. The method of claim 16, wherein the image location indicators comprise both the first type of image location indicator and the second type of image location indicator.

19. A mobile computing device, comprising:
a processor;
a camera;
at least one sensor;
a display; and
a transceiver;
wherein the processor causes user location indicators and image location indicators to be displayed on the display, wherein the image location indicators comprise at least one of a first type of image location indicator including a graphical horizontal line that is to be aligned with a horizontal line that separates a wall from a floor, or a second type of image location indicator including a graphical horizontal line that is to be aligned with a horizontal line that separates a wall from a ceiling;

wherein the camera and the at least one sensor obtain images and corresponding orientation information for each of a plurality of walls of each of one or more rooms; and wherein the transceiver transfers the obtained images and corresponding orientation information to a remote system that is configured to generate 3D models of rooms based on images, and receives data that enables a 3D model of the one or more rooms to be displayed on the display.

20. The mobile computing device of claim 19, wherein the at least one sensor comprises at least one of an accelerometer, a magnetometer or a gyroscope.

21. The mobile computing device of claim 19, wherein:
the user location indicators provide an indication of a user location where the user should position themselves in a room including a plurality of walls; and
the image location indicators provide an indication of where the user, once positioned at the indicated location, should point the camera of the mobile computing device.

22. The mobile computing device of claim 19, wherein the image location indicators comprise both the first type of image location indicator and the second type of image location indicator.

* * * * *